(12) United States Patent
Kim et al.

(10) Patent No.: US 9,099,721 B2
(45) Date of Patent: Aug. 4, 2015

(54) HIGH-POWER LITHIUM SECONDARY BATTERY

(75) Inventors: Jong Hwan Kim, Daejeon (KR); Han Ho Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 124 days.

(21) Appl. No.: 13/140,725

(22) PCT Filed: Dec. 21, 2009

(86) PCT No.: PCT/KR2009/007652
§ 371 (c)(1),
(2), (4) Date: Aug. 4, 2011

(87) PCT Pub. No.: WO2010/071387
PCT Pub. Date: Jun. 24, 2010

(65) Prior Publication Data
US 2011/0293977 A1  Dec. 1, 2011

(30) Foreign Application Priority Data

Dec. 19, 2008  (KR) .................. 10-2008-0130665
Dec. 21, 2009  (KR) .................. 10-2009-0128286

(51) Int. Cl.
*H01M 2/16*  (2006.01)
*H01M 10/0587*  (2010.01)
*H01M 4/13*  (2010.01)
(Continued)

(52) U.S. Cl.
CPC ............ *H01M 2/166* (2013.01); *H01M 2/1653* (2013.01); *H01M 2/1686* (2013.01); *H01M 4/13* (2013.01); *H01M 4/139* (2013.01);
(Continued)

(58) Field of Classification Search
CPC .......... H01M 10/058; H01M 10/0583; H01M 10/0585; H01M 10/0587; H01M 10/0431; H01M 10/0436; H01M 10/044; H01M 10/0445; H01M 10/045; H01M 10/0454; H01M 10/0459; H01M 10/0463; H01M 2/166
USPC .................................. 429/209, 211, 247–255
See application file for complete search history.

(56) References Cited

U.S. PATENT DOCUMENTS

2003/0134202 A1*  7/2003  Chang et al. ................... 429/241
2004/0247998 A1*  12/2004  Nakanishi et al. ............. 429/161
(Continued)

FOREIGN PATENT DOCUMENTS

JP       11-162444 A      6/1999
JP       2000040501   *  2/2000   .............. H01M 2/22
(Continued)

*Primary Examiner* — Muhammad Siddiquee
(74) *Attorney, Agent, or Firm* — McKenna Long & Aldridge, LLP (57) ABSTRACT

Provided is a secondary battery including an electrode assembly. The electrode assembly includes a positive electrode, a negative electrode, and a separator. The positive electrode includes a positive electrode non-coating portion that is not coated with an active material in a portion of a positive electrode collector. The negative electrode includes a negative electrode non-coating portion that is not coated with an active material in a portion of a negative electrode collector. The non-coating portions are disposed in at least one of upper and lower portions of the electrode assembly in a longitudinal direction of the electrodes. A positive electrode tab and a negative electrode tab are connected to the non-coating portions. The separator is a complex porous separator including a substrate coated with a binder polymer or an organic/inorganic mixture formed of a binder polymer and inorganic particles.

14 Claims, 6 Drawing Sheets

(51) Int. Cl.
  *H01M 10/052* (2010.01)
  *H01M 10/058* (2010.01)
  *H01M 4/139* (2010.01)
  *H01M 10/04* (2006.01)
  *H01M 2/14* (2006.01)

(52) U.S. Cl.
  CPC ........ *H01M10/0431* (2013.01); *H01M 10/052* (2013.01); *H01M 10/058* (2013.01); *H01M 10/0587* (2013.01); *H01M 2/145* (2013.01); *Y02E 60/122* (2013.01)

(56) References Cited

U.S. PATENT DOCUMENTS

2005/0277022 A1   12/2005   Kozuki
2005/0287430 A1*  12/2005  Kim et al. ............... 429/161
2006/0008700 A1*  1/2006  Yong et al. ............. 429/144
2006/0024578 A1*  2/2006  Lee ............................ 429/208
2006/0046149 A1   3/2006  Yong et al.
2008/0057396 A1*  3/2008  Fujihara et al. ........ 429/212
2011/0281150 A1   11/2011  Yong et al.

FOREIGN PATENT DOCUMENTS

| | | |
|---|---|---|
| JP | 2002-298906 | 10/2002 |
| JP | 2005-353519 | 12/2005 |
| JP | 2008-041581 | 2/2008 |
| JP | 2008-508391 | 3/2008 |
| KR | 10-2004-0043039 A | 3/2004 |
| KR | 10-2006-0010482 A | 2/2006 |
| KR | 10-2006-0021221 A | 3/2006 |

* cited by examiner

HIGH-POWER LITHIUM SECONDARY BATTERY

This application is a national stage application of PCT/KR2009/007652, filed Dec. 21, 2009, which claims the priority to Korean Patent Application Nos. KR 10-2008-0130655, filed Dec. 19, 2008 and KR 10-2009-0128286, filed Dec. 21, 2009, all of which are hereby incorporated by reference in their entirety.

TECHNICAL FIELD

The present invention relates to a high-power lithium secondary battery, and more particularly, to a high-power lithium secondary battery including a complex porous separator including a substrate coated with a binder polymer or a mixture of binder polymer/inorganic particles, and positive and negative electrodes including non-coating portions that are not coated with an active material and that are disposed in at least one of the upper and lower portions of an electrode assembly, and not in a wound end of the electrode assembly, in which positive and negative electrode tabs are connected to the non-coating portions. Only the non-coating portions are disposed in at least one of the upper and lower portions of a jelly-roll, to thereby substantially provide a laminated structure in which the positive electrode, the separator, and the negative electrode are integrally formed, which reduces the distance over which electric current should flow, thereby decreasing resistance and increasing the output of the battery.

BACKGROUND ART

With recent growing interest in energy storage technologies, research and development efforts on batteries are becoming more focused. Under these circumstances, electrochemical devices are attracting the most attention, and from among such devices, interest in the development of rechargeable secondary batteries is paramount.

As the demand for portable electronic devices significantly increases, so does that for secondary batteries. Of such secondary batteries, there are remarkable advances being made for lithium secondary batteries that have high energy density, high discharge voltage, and excellent output stability.

The making of highly functional and miniaturized electronic devices is giving rise to requirements for secondary batteries to also have high performance, miniature size, and be available in various forms. For example, since the thickness of a notebook computer largely depends on the size of its secondary battery, various research efforts are underway to reduce the thickness of secondary batteries, improve their capacity and performance, and alter their shapes. In addition, as the environment becomes a more serious concern, the development of electric vehicles and hybrid electric vehicles that employ secondary batteries is accelerating to address the issue of global warming.

A lithium secondary battery includes electrolyte and an electrode assembly immersed in the electrolyte. The electrode assembly includes: a positive electrode coated with a positive electrode mixture including a lithium transition metal oxide as an active material; a negative electrode coated with a negative electrode mixture including a carbon-based active material; and a separator. Since lithium ions migrate through the electrolyte, if the electrolyte leaks, the lithium transition metal may be exposed to air to cause the battery to explode. Also, a chemical reaction from overcharging of the battery may increase the inner pressure of the battery case, causing the battery to explode. To address these issues, lithium ion batteries require a protective circuit. As such, since lithium ion batteries have the possibility of explosion, commercialized lithium ion batteries are provided in the form of a pack with a protective circuit.

Safety is the most important factor for lithium or lithium ion batteries that use non-aqueous electrolyte. Of particular importance is the prevention of short circuiting and overcharging.

Such secondary batteries are classified into nickel cadmium batteries, nickel hydrogen batteries, lithium ion batteries, and lithium polymer batteries according to the materials used for their positive electrode, negative electrode, and electrolyte, and the batteries are further classified into cylinder type batteries, prismatic type batteries, and pouch type batteries according to their shapes.

With respect to battery shapes, prismatic type batteries and pouch type batteries, which are thin and can be used in products such as portable phones, are in high demand. In terms of materials, lithium ion batteries such as lithium cobalt polymer batteries, which have high energy density, high discharge voltage, and excellent safety, are popular.

A main area of research on secondary batteries is improving safety. When a lithium secondary battery operates under abnormal conditions such as with an internal short circuit, in a charge state in which current and voltage exceed allowable thresholds, when exposure to high temperature, or subjected to an impact from being dropped, the inner temperature and pressure of the battery may increase, causing the battery to explode.

Figure 1:
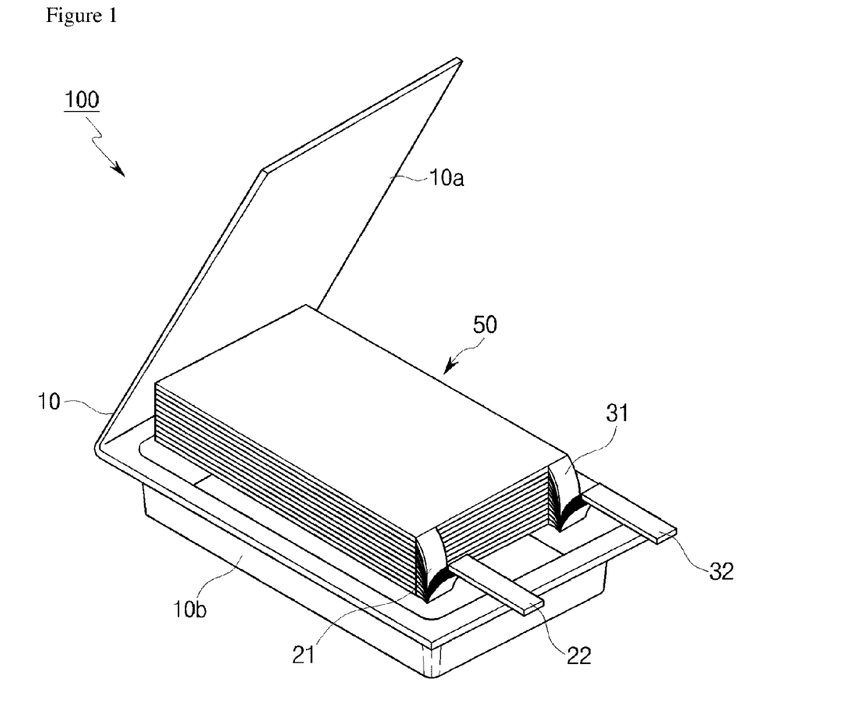
FIG. 1 is a perspective view illustrating a pouch type battery in the related art.

FIG. 1 is a schematic view illustrating a typically configured pouch type polymer secondary battery 100 in the related art. Referring to FIG. 1, the pouch type polymer secondary battery 100 includes a pouch type battery case 10 and an electrode assembly 50. The case 10 includes an aluminum laminated sheet with an upper sheet 10a and a lower sheet 10b. The case 10 accommodates the electrode assembly 50 including a positive electrode, a negative electrode, and a separator (not shown) disposed therebetween, and is sealed such that electrode leads 22 and 32 connected to a positive electrode tab 21 and a negative electrode tab 31 of the electrode assembly 50 are exposed to the outside of the case 10.

In a typical pouch type polymer secondary battery as illustrated in FIG. 1, a positive electrode, a separator, and a negative electrode are stacked, and each of the positive and negative electrodes includes a non-coating portion (tab). In this case, a positive electrode tab of each layer of an electrode assembly is connected to a positive electrode lead, and a negative electrode tab of each layer is connected to a negative electrode lead, thereby reducing resistance.

Figure 2:
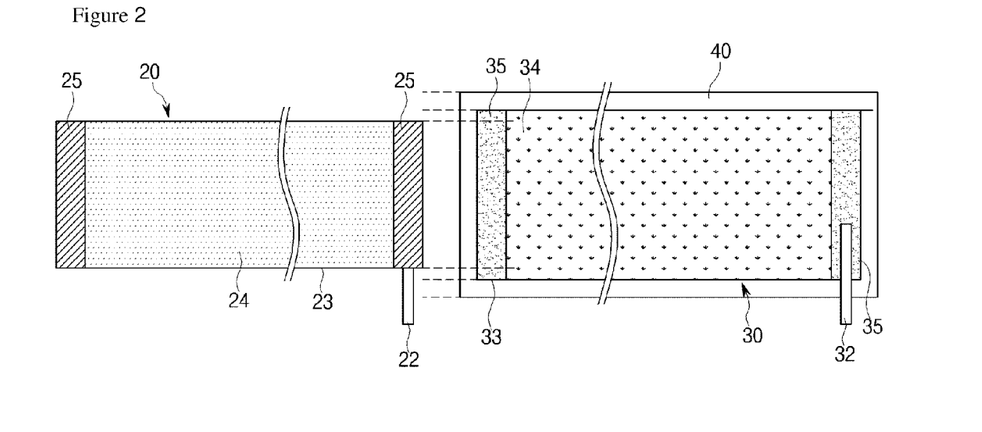
FIG. 2 is a schematic view illustrating an electrode assembly of a prismatic type battery in the related art.
Figure 3:
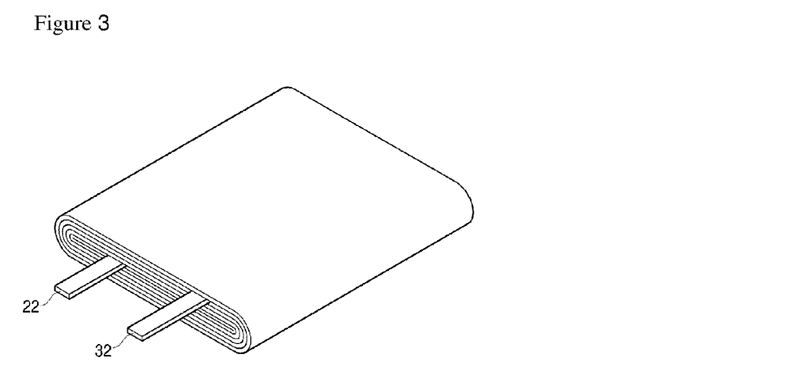
FIG. 3 is a perspective view illustrating the electrode assembly of FIG. 2 after being wound in a jelly-roll shape.
Figure 4:
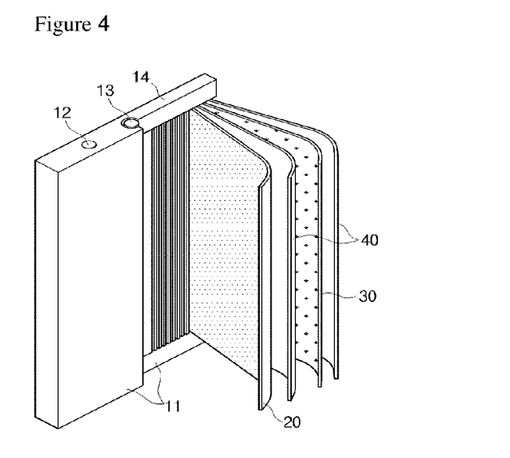
FIG. 4 is perspective view illustrating a prismatic type battery accommodating the electrode assembly of FIG. 3.

FIGS. 2, 3 and 4 are schematic views illustrating a prismatic type battery having a jelly-roll shape in the related art. A positive electrode 20 and a negative electrode 30 are wound with a separator 40 therebetween. At least one of both surfaces of a positive electrode collector 23 constituting the positive electrode 20 is coated with a positive electrode active material 24. At least one of an active material coating start portion and an active material coating end portion of the positive electrode collector 23 is provided with a non-coating portion 25 that is not coated with the positive electrode active material 24. In FIG. 2, the non-coating portions 25 are disposed at both the active material coating start portion and the active material coating end portion.

At least one of both surfaces of a negative electrode collector 33 constituting the negative electrode 30 is coated with a negative electrode active material 34. At least one of an active material coating start portion and an active material coating end portion of the negative electrode collector 33 is provided with a non-coating portion 35 that is not coated with the negative electrode active material 34. In FIG. 2, the non-coating portion 35 is disposed at both the active material coating start portion and the active material coating end portion of the negative electrode collector 33.

The positive electrode active material 24 applied on the positive electrode collector 23 and the negative electrode active material 34 applied on the negative electrode collector 33 have predetermined widths, and the positive electrode 20 and the negative electrode 30 are wound in a jelly-roll shape to form the battery. The width of the negative electrode active material 34 may be greater than the width of the positive electrode active material 24.

The negative electrode 30 and the positive electrode 20 are provided with terminals that are externally connected. As illustrated in FIG. 2, a positive electrode tab 22 is disposed on the non-coating portion 25 that is a start portion not coated with the positive electrode active material 24, and a negative electrode tab 32 is disposed on the non-coating portion 35 that is an end portion not coated with the negative electrode active material 34.

Thus, when the positive electrode 20, the negative electrode 30, and the separator 40 disposed therebetween are wound, the non-coating portion 25 is disposed at a roll start portion not coated with the positive electrode active material 24, and the non-coating portion 35 is disposed at a roll end portion not coated with the negative electrode active material 34. Accordingly, an electrode assembly wound in a jelly-roll shape is connected to the positive electrode tab 22 and the negative electrode tab 32 as external terminals. As illustrated in FIG. 3, the positive electrode tab 22 is connected to the non-coating portion 25 in the innermost portion of the jelly-roll shape, and the negative electrode tab 32 is connected to the non-coating portion 35 in the outermost portion of the jelly-roll shape.

The electrode assembly configured as described above is accommodated in the prismatic type battery as illustrated in FIG. 4.

As described above, since the positive and negative electrode tabs 22 and 32 are disposed in the start portion and the end portion, respectively, the distance over which electric current should flow is increased, and thus, resistance is also increased. Therefore, a battery configured as described above may be inappropriate for a power tool, an electric vehicle (EV), a hybrid electric vehicle (HEV), and a plug-in hybrid electric vehicle (PHEV), which require high output power.

Also, in a typical prismatic type battery, an electrode assembly including a positive electrode, a separator, and a negative electrode is not integrated. If an electrode assembly of a typical prismatic type battery is integrated, a subsequent process such as a tab lead welding process and a process of inserting an electrode assembly into an exterior part, can be facilitated, twisting of the electrode assembly due to contraction and expansion of an active material during charging and discharging can be suppressed, and a short circuit due to external shock can be prevented, thereby improving safety of the battery.

Thus, a high-power secondary battery, which includes an electrode assembly with a positive electrode and a negative electrode integrated through a separator and has improved processability and safety, is required.

DISCLOSURE

Technical Problem

An aspect of the present invention provides an electrode assembly and a high-power secondary battery including electrode tabs out of a start or end portion of electrodes, which facilitates subsequent processes after forming the electrode assembly and is resistant to external shock.

Technical Solution

According to an embodiment of the present invention, non-coating portions are disposed in at least one of the upper and lower portions of electrodes in the longitudinal direction of the electrode, instead of disposing the non-coating portions on a start or end portions of a collector foil of a positive or negative electrode, and active materials are applied out of the non-coating portions. In addition, the non-coating portions disposed in at least one of the upper and lower portions of the electrode are connected to electrode tabs to reduce the distance over which electric current should flow, thereby decreasing resistance and increasing the output of the battery.

According to an embodiment of the present invention, a complex porous separator includes a substrate coated with a binder polymer or a mixture of binder polymer and inorganic particles. The electrode assembly forming by winding the positive electrode, the negative electrode, and the complex porous separator disposed therebetween has an integral laminated structure through a press process, thereby facilitating a subsequent process and improving the safety of the battery against external shock.

Thus, embodiments of the present invention provide an electrode assembly that reduces the distance over which electric current should flow, thereby decreasing resistance, high-power secondary battery including the electrode assembly, and a medium-to-large battery including a plurality of secondary batteries.

Advantageous Effects

According to the embodiment of the present invention, the non-coating portions are disposed in at least one of the upper and lower portions of the electrode assembly in the longitudinal direction of the electrodes, and are connected to the electrode tabs, which reduces the distance over which electric current should flow, thereby decreasing resistance and increasing the output of the battery.

The separator according to the embodiment of the present invention is a separator including a substrate coated with a binder polymer, or a complex separator including a substrate coated with an organic/inorganic mixture formed of a binder polymer and inorganic particles, to provide a laminated structure in which the positive electrode, the separator, and the negative electrode are integrally formed, thereby facilitating a battery fabrication process and improving the performance and safety of the battery.

In addition, since the jelly-roll shaped electrode assembly including the complex porous separator is integrated through the hot press process, the electrode assembly can be applied to a pouch type battery as well as a prismatic type battery.

In addition, since the electrode assembly according to the embodiment has the laminated structure in which the positive electrode and the negative electrode are integrated through the separator, a subsequent process for fabricating a secondary battery is facilitated, and a secondary battery having improved safety can be fabricated.

In addition, in the secondary battery according to the embodiment of the present invention, the non-coating portions connected to the electrode tabs are continuously disposed in at least one of the upper and lower portions of the electrode assembly, thereby preventing the increase of resistance due to the increase of the number of winding turns.

Thus, the secondary batteries according to the embodiment of the present invention may be connected to each other to function as a medium-to-large battery for power tools receiving power by an electric motor requiring high power; electric vehicles (EVs) including a hybrid electric vehicle (HEV) and a plug-in hybrid electric vehicle (PHEV); electric two-wheeled vehicles including an E-bike and an E-scooter; and an electric golf cart, but is not limited thereto.

DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

MODE FOR INVENTION

According to an embodiment of the present invention, an electrode assembly includes a positive electrode, a negative electrode, and a separator. The positive electrode includes a positive electrode non-coating portion that is not coated with an active material in a portion of a positive electrode collector. The negative electrode includes a negative electrode non-coating portion that is not coated with an active material in a portion of a negative electrode collector. The non-coating portions are disposed in at least one of upper and lower portions of the electrode assembly in a longitudinal direction of the electrodes. A positive electrode tab and a negative electrode tab are connected to the non-coating portions. The separator is a complex porous separator including a substrate coated with a binder polymer or an organic/inorganic mixture formed of a binder polymer and inorganic particles.

According to another embodiment of the present invention, a secondary battery includes the electrode assembly, and a medium-to-large battery includes the secondary battery. The secondary battery is provided in plurality, and the secondary batteries are connected to each other to form the medium-to-large battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Hereinafter, embodiments will be described in detail with reference to the accompanying drawings.

According to an embodiment of the present invention, non-coating portions of a positive electrode and a negative electrode are disposed in at least one of the upper and lower portions of the electrodes in the longitudinal direction of the electrodes. An electrode assembly includes a porous separator or an organic/inorganic complex porous separator including a substrate coated with an active layer formed of inorganic particles and a binder polymer. The electrode assembly including the positive electrode, the negative electrode, and the separator disposed therebetween is wound in a jelly-roll shape, and is pressed, to thereby have an integral laminated structure.

Figure 5:
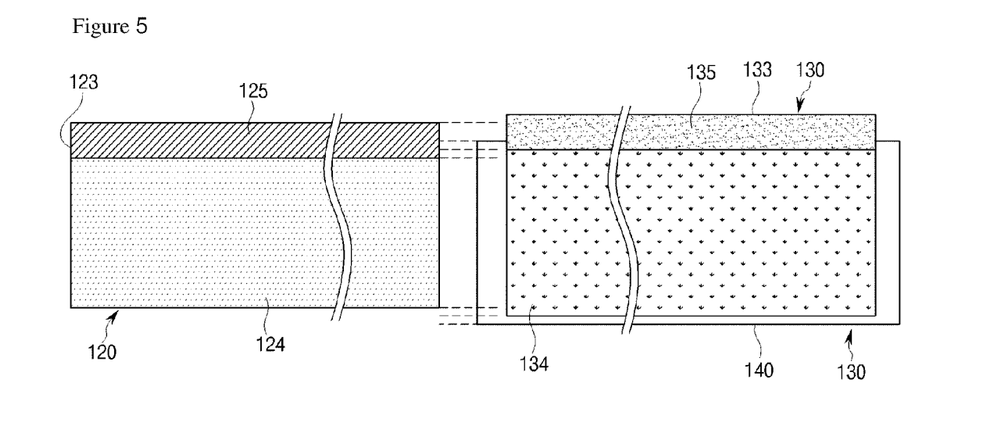
FIGS. 5 to 7 are schematic views illustrating electrode assemblies according to an embodiment of the present invention.
Figure 6:
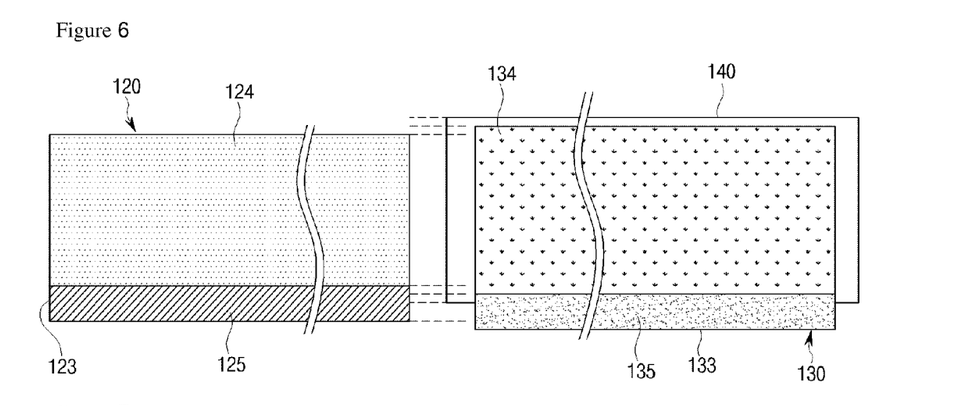
Figure 7:
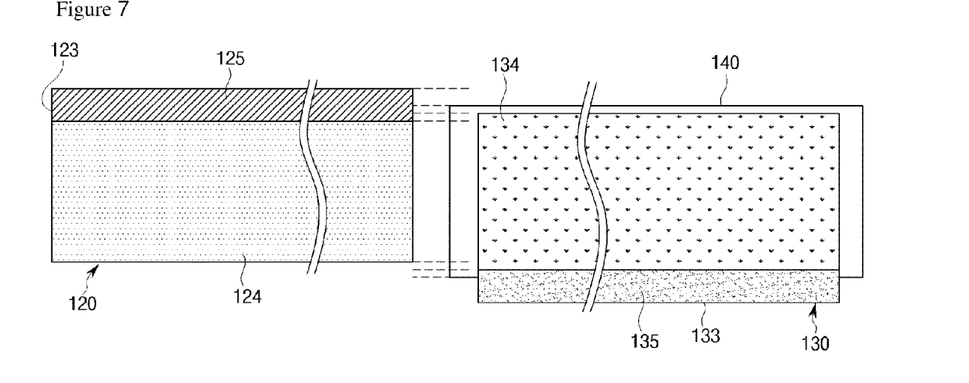

Referring to FIGS. 5 to 7, non-coating portions of a positive electrode and a negative electrode are disposed in at least one of the upper portion and the lower portion of the electrodes in the longitudinal direction of the electrodes.

Referring to FIG. 5, a positive electrode non-coating portion 125 and a negative electrode non-coating portion 135 are disposed in the upper portion of electrodes in the longitudinal direction of the electrodes.

Referring to FIG. 6, the positive electrode non-coating portion 125 and the negative electrode non-coating portion 135 are disposed in the lower portion of the electrodes in the longitudinal direction of the electrodes.

As illustrated in FIGS. 5 and 6, when both the positive electrode non-coating portion 125 and the negative electrode non-coating portion 135 are disposed in one of the lower and upper portions of the electrodes in the longitudinal direction of the electrodes, a positive electrode tab may not overlap a negative electrode tab.

Referring to FIG. 7, the positive electrode non-coating portion 125 and the negative electrode non-coating portion 135 are disposed in the upper and lower portions of the electrodes in the longitudinal direction of the electrodes.

In detail, referring to FIG. 7, a positive electrode active material slurry including a positive electrode active material, a binder, and a conductive material is uniformly applied on at least one surface of a positive electrode collector 123 of a positive electrode 120 from a position spaced a predetermined distance from the upper end of the positive electrode collector 123 to form a positive electrode active material coating portion 124. Thus, a region extending down to the position spaced the predetermined distance from the upper end of the positive electrode collector 123, that is, a portion that is not coated with the positive electrode active material is the positive electrode non-coating portion 125, and is disposed in the upper portion of the positive electrode collector 123 in the longitudinal direction thereof.

The positive electrode non-coating portion 125 disposed in the upper portion of the positive electrode collector 123 is spaced apart from the upper end such that the positive electrode tab can be welded to the positive electrode non-coating portion 125. For example, the positive electrode non-coating portion 125 may be spaced apart from the upper end by a distance ranging from about 1 mm to about 20 mm.

A negative electrode active material slurry including a negative electrode active material, a binder, and a conductive material is uniformly applied on at least one surface of a negative electrode collector 133 of a negative electrode 130 from a position spaced a predetermined distance from the lower end of the negative electrode collector 133 to form a negative electrode active material coating portion 134. Thus, the negative electrode non-coating portion 135, which is not coated with the negative electrode active material, is disposed entirely in the lower portion of the negative electrode collector 133.

The negative electrode non-coating portion 135 disposed in the lower portion of the negative electrode collector 133 is spaced apart from the lower end such that the negative electrode tab can be welded to the negative electrode non-coating portion 135. For example, the negative electrode non-coating portion 135 may be spaced apart from the lower end by a distance ranging from about 1 mm to about 20 mm.

Although the positive electrode non-coating portion 125 and the negative electrode non-coating portion 135 are disposed respectively in the upper and lower portions of an electrode assembly in the longitudinal direction of the electrode assembly in FIG. 7, the positive electrode non-coating portion 125 and the negative electrode non-coating portion 135 are disposed in the lower and upper portions of the electrode assembly in the longitudinal direction, respectively. That is, when the electrode assembly is wound in a jelly-roll shape, the positive electrode non-coating portion 125 and the negative electrode non-coating portion 135 may be disposed in at least one of the upper and lower portions of the electrode assembly in the longitudinal direction of the electrode assembly.

Thus, according to the current embodiment, the positive electrode tab and the negative electrode tab may be disposed in the same side or opposite sides to each other according to positions of the positive electrode non-coating portion 125 and the negative electrode non-coating portion 135.

Thus, the positive and negative electrode active material coating portions 124 and 134 are disposed in at least one of the upper and lower portions of the electrode assembly on at least one surface of the electrode assembly, and are spaced apart from the upper or lower end of the electrode assembly by the lengths of the positive and negative electrode non-coating portions 125 and 135.

A separator 140 is disposed between the positive electrode 120 and the negative electrode 130. Although positions of the positive and negative electrode non-coating portions 125 and 135 vary as described above, the size and position of the separator 140 are the same in FIGS. 2, 5, 6 and 7. That is, even when the positive and negative electrode non-coating portions 125 and 135 are disposed in the upper and lower portions of the electrode assembly, it is unnecessary to modify the separator 140, provided that the separator 140 covers the positive and negative electrode active material coating portions 124 and 134.

The separator 140, which is disposed between the positive electrode 120 and the negative electrode 130 to insulate the positive electrode 120 and the negative electrode 130, is a complex porous separator including a substrate coated with a binder polymer or a mixture of a binder polymer and inorganic particles.

That is, the complex porous separator is formed by coating a substrate with a binder polymer, or by coating a substrate with an organic/inorganic mixture of a binder polymer and inorganic particles.

Examples of the binder polymer applied on the substrate constituting may include polyvinylidenefluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, acrylonitrile-styrene-butadiene copolymer, polyimide, and a mixture thereof, but is not limited thereto. Moreover, any material or a mixture thereof may be used, provided that the material has the above-described characteristics.

The organic/inorganic complex separator is an organic/inorganic complex porous separator, which includes: a substrate having a porous part; and an active layer formed by coating at least one of both a surface of the substrate and a portion of the porous part with a mixture of porous inorganic particles and a binder polymer. A plurality of macropores having a diameter of about 50 nm or greater are disposed in the porous inorganic particle to provide a porous structure.

In the current embodiment, porous inorganic particles, in which a plurality of macropores having a uniform diameter of about 50 nm or greater and a uniform shape are disposed, are used to constitute the organic/inorganic complex porous separator.

In the related art, since an organic/inorganic complex layer used as a component and a coating material of a separator includes inorganic particles, the safety of a battery can be ensured. However, since the inorganic particles are non-porous particles, the weight of the battery is increased. However, in the current embodiment, since the porous inorganic particles have a plurality of macropores therein, safety and performance of the battery can be improved, and the weight thereof can be significantly decreased. Since the weight of the battery is decreased, energy density per unit weight of the battery is increased.

In the organic/inorganic complex porous separator according to the current embodiment, a component applied on at least one of a surface of the substrate and a portion of the porous part may be any well-known inorganic particle in the art, provided that the inorganic particle has a pore size for lithium ions solvated by molecules of electrolyte to pass through pores. For example, the pores may be macropores having a diameter of about 50 nm or greater.

The macropores may be separately disposed in the particles, or be connected to each other.

The inorganic particle may include at least one selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof, but is not limited thereto.

The inorganic particle may have a size ranging from about 0.1 μm to about 10 μm, but is not limited thereto. If the inorganic particle has a size of about 0.1 μm or smaller, since dispersion performance is degraded, it is difficult to control the structure and physical property of the organic/inorganic complex porous separator. If the inorganic particle has a size greater than about 10 μm, the thickness of the organic/inorganic complex porous separator fabricated using the same content of a solid is increased, thereby degrading mechanical property. In addition, an excessively large pore size may increase the possibility of a short circuit during charging and discharging of the battery.

An organic component of the organic/inorganic complex porous separator stably fixes the inorganic particles to improve structural safety, and increases ionic conductivity and the rate of electrolyte impregnation to improve the performance of the battery. To this end, the organic component may be a binder polymer that is not dissolved in the electrolyte and undergoes gelation due to swelling of the electrolyte.

The binder polymer may include polyvinylidenefluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose, acrylonitrile-styrene-butadiene copolymer, polyimide, or a mixture thereof, but is not limited thereto. Moreover, any material or a mixture thereof may be used, provided that the material has the above-described characteristics.

An organic/inorganic complex layer of the organic/inorganic complex porous separator may include a typical additive as well as the porous inorganic particle and the binder polymer.

The substrate of the organic/inorganic complex porous separator formed of the binder polymer or the binder polymer/the inorganic particles may be any porous separator substrate having a porous part. For example, the substrate may be a polyolefin-based substrate or heat-resistant porous substrate, which is typically used in the art. Particularly, the heat-resistant porous substrate prevents shrinking of a separator due to at least one of internal heat and external heat, thereby ensuring thermal safety of an organic/inorganic complex porous separator.

The substrate of the organic/inorganic complex porous separator may include high density polyethylene, low density polyethylene, linear low density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, a mixture thereof, or heat-resistant engineering plastic, but is not limited thereto.

The structure of electrodes according to an embodiment of the present invention and the structure of electrodes according to the related art will now be described in more detail with reference to FIGS. 2 through 11. Active materials are applied on the positive electrode collectors 23 and 123 and the negative electrode collectors 33 and 133 to form positive electrodes and negative electrodes.

When the non-coating portions 25 and 35 are disposed at start portions and end portions in the lateral direction of the electrodes in the related art, application of active materials starts from positions spaced apart from at least one of the start portion and the end portion by distances corresponding to the non-coating portions 25 and 35. Thus, when a non-coating portion of one of the positive and negative electrodes is disposed at the start portion of the electrode, the non-coating portion is disposed in the innermost portion of a roll structure. When a non-coating portion of one of the positive and negative electrodes is disposed at the end portion of the electrode, the non-coating portion is disposed in the outermost portion of the roll structure. The non-coating portions are disposed at the start portions or the end portions, and are connected to positive and negative electrode tabs. An electrode assembly configured as described above is accommodated in a prismatic type battery as illustrated in FIG. 4.

However, referring to FIG. 5, an active material is applied on start and end portions of an electrode in the lateral direction thereof without forming a non-coating portion, according to the embodiment of the present invention. Since the positive and negative electrode non-coating portions 125 and 135 are disposed in at least one of the upper and lower portions of an electrode assembly in the longitudinal direction of electrodes, active materials are applied on the start and end portions in the lateral direction of the electrodes without a non-coating portion, but are applied on at least one of the upper and lower portions of the electrode assembly such that the active materials are spaced apart from at least one of the upper and lower ends of the electrode assembly just by distances corresponding to the positive and negative electrode non-coating portions 125 and 135.

This structure is identically applied to the case of FIG. 5 where both a positive electrode non-coating portion and a negative electrode non-coating portion are disposed at the upper portion of electrodes, the case of FIG. 6 where both a positive electrode non-coating portion and a negative electrode non-coating portion are disposed at the lower portion of electrodes, and the case of FIG. 7 where a positive electrode non-coating portion and a negative electrode non-coating portion are disposed at the upper and lower portions of electrodes.

Figure 8:
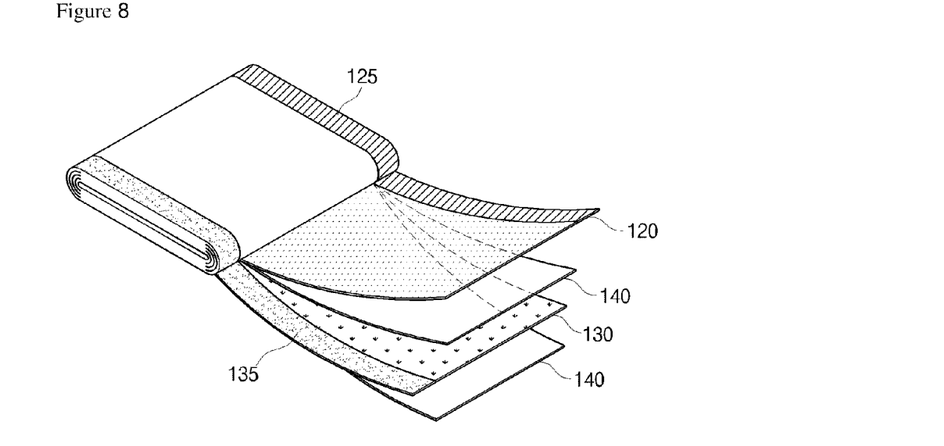
FIGS. 8 to 11 are perspective views illustrating an electrode assembly wound in a jelly-roll shape according to an embodiment of the present invention.

The positive and negative electrodes configured as described above and a separator disposed therebetween are wound in a jelly-roll shape as illustrated in FIG. 8. In this case, the positive and negative electrode non-coating portions 125 and 135 are disposed in the upper and lower portions of the electrode assembly in the longitudinal direction of the electrode assembly, respectively, which is different from the related art where the non-coating portions 25 and 35 are disposed in the winding start and end portions in the lateral direction of the electrodes.

Figure 9:
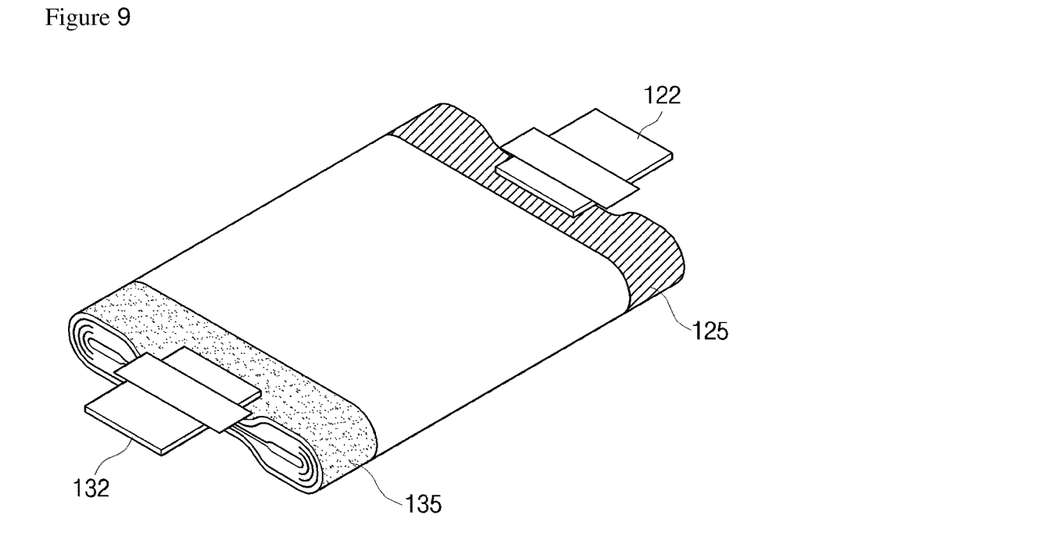
Figure 10:
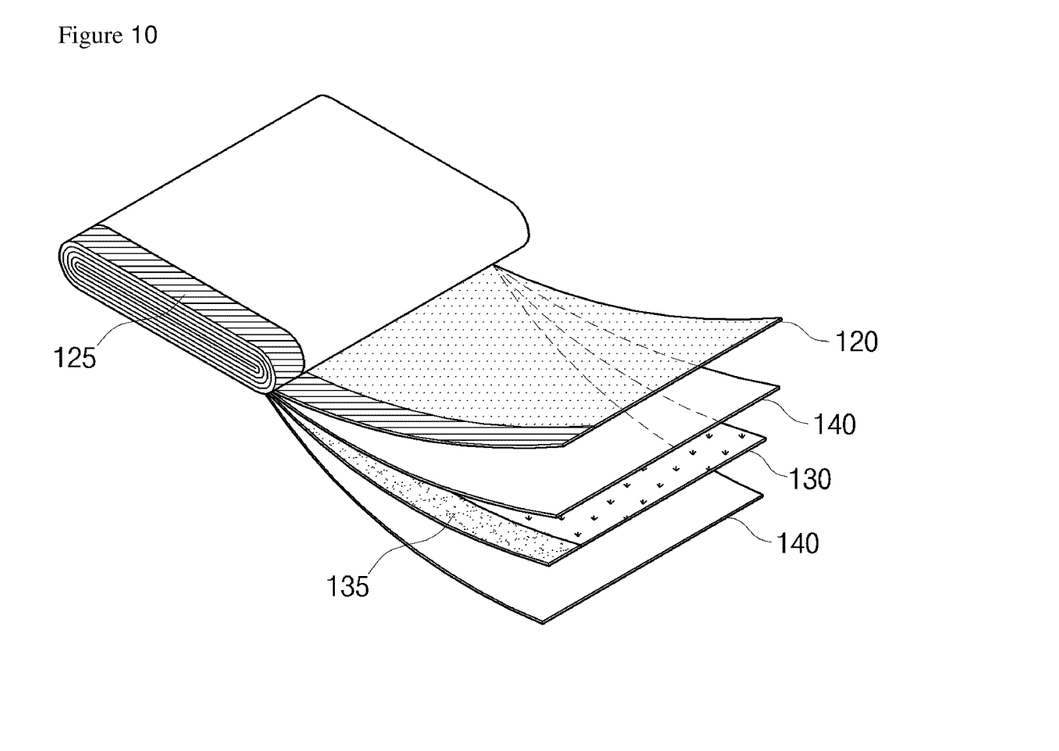
Figure 11:
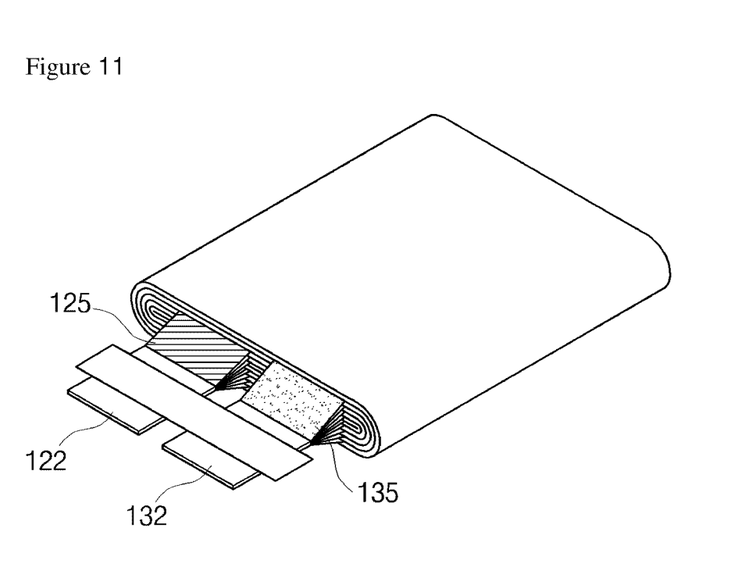

The positive and negative electrode non-coating portions 125 and 135 are connected to lead tabs 122 and 132, respectively, as illustrated in FIG. 9. Referring to FIGS. 10 and 11, both the positive and negative electrode non-coating portions 125 and 135 are disposed in the lower portion, and are connected to the lead tabs 122 and 132, respectively.

Figure 12:
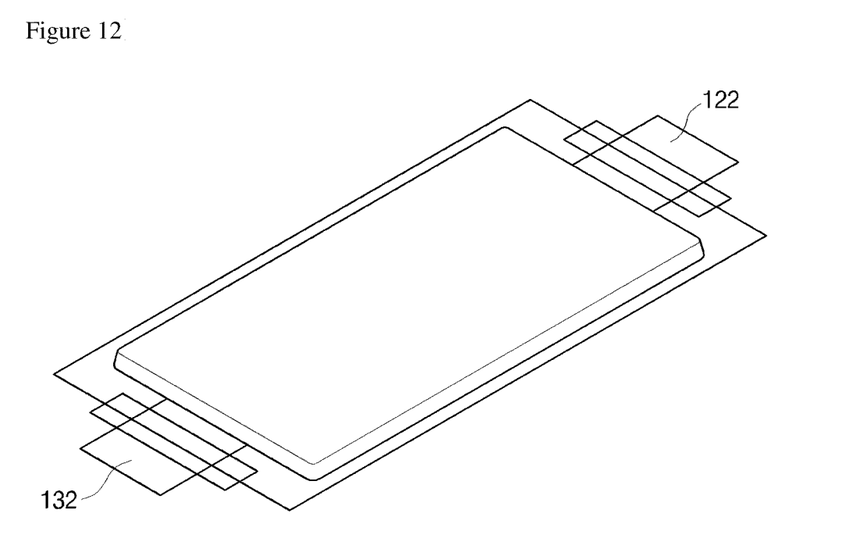
FIG. 12 is a perspective view illustrating an electrode assembly accommodated in a pouch type exterior part according to an embodiment of the present invention.

The electrode assembly of FIGS. 8 and 9 are accommodated in a pouch type exterior part as illustrated in FIG. 12.

As a result, in the secondary battery according to the embodiment of the present invention, the non-coating portions connected to the lead tabs are continuously disposed in at least one of the upper and lower portions of the electrode assembly, thereby preventing the increase of resistance due to the increase of the number of winding turns. Thus, secondary batteries according to an embodiment of the present invention may be connected to each other to function as a medium-to-large battery for a power tool receiving power by an electric motor requiring high power; electric vehicles (EVs) including a hybrid electric vehicle (HEV) and a plug-in hybrid electric vehicle (PHEV); electric two-wheeled vehicles including an E-bike and an E-scooter; and an electric golf cart.

The electrode assembly manufactured according to the above embodiment has a laminated structure in which the positive electrode, the separator, and the negative electrode are integrally formed through a press process. The press process may be a hot press process or a thermo-compression press process, but is not limited thereto, provided that an integral laminated structure can be formed under a constant pressure.

Press temperature, holding time, and pressure of the press process may be varied according to a binder and the shape and thickness of a jelly-roll.

When a positive electrode, a separator, and a negative electrode are wound to fabricate a winding type electrode, the separator may be spaced apart from each electrode to form a wave shape therebetween. In this case, it may be difficult to insert the electrode assembly into an exterior part such as a can, and the safety of a battery may be affected.

Also, since the electrode assembly according to the embodiment has the laminated structure in which the positive electrode and the negative electrode are integrated through the separator, a subsequent process such as a tab lead welding process and a process of inserting an electrode assembly into an exterior part can be facilitated, and twisting of the electrode assembly due to contraction and expansion of an active material during charging and discharging can be suppressed, and a short circuit due to external shock can be prevented, thereby improving safety of the battery.

That is, since the electrode assembly according to the embodiment has the laminated structure in which the positive electrode and the negative electrode are integrated through the separator, a subsequent for fabricating a secondary battery is facilitated, and a secondary battery having improved safety can be fabricated.

Furthermore, if a process of forming a laminated structure in which the positive electrode, the separator, and the negative electrode are integrally formed through a hot press process is removed, an embodiment of the present invention can be applied to a cylinder type battery.

A positive electrode active material according to an embodiment of the present invention may be mixed with a compound including a lithium intercalation material as a main component. The lithium intercalation material may include: a layered compound such as lithium cobalt oxide ($LiCoO_2$), lithium nickel oxide ($LiNiO_2$) or a compound substituted with at least one transition metal; lithium manganese oxide such as a chemical formula $Li_{1+x}Mn_{2-x}O_4$ (where, x ranges from 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; nickelcite lithiated nickel oxide expressed by a chemical formula $LiNi_{1-x}M_xO_2$ (where, M=Co, Mn, Al, Cu, Fe, Mg, B, or Ga, and x=0.01 to 0.3); lithium manganese complex oxide expressed by a chemical formula $LiMn_{2-x}M_xO_2$ (where, M=Co, Ni, Fe, Cr, Zn, or Ta, and x=0.01 to 0.1) or $Li_2Mn_3MO_8$ (where, M=Fe, Co, Ni, Cu, or Zn); $LiMn_2O_4$ with a part of lithium of a chemical formula being substituted with an alkaline earth metal ion; a disulfide compound; or a complex oxide formed of $Fe_2(MoO_4)_3$ or a combination thereof.

When a separator according to an embodiment of the present invention is a separator including a substrate coated with a binder polymer, or a complex separator including a substrate coated with an organic/inorganic mixture formed of a binder copolymer and inorganic particles, the binder polymer makes it possible to facilitate designing of a laminated structure in which a positive electrode, a separator, and a negative electrode are integrated through a hot press process. Thus, the laminated structure in which a positive electrode, a separator, and a negative electrode are integrated makes it possible to facilitate a battery fabrication process and to improve the performance and safety of a battery. In addition, since a jelly-roll shaped electrode assembly including the complex porous separator is integrated, the electrode assembly can be applied to a pouch type battery as well as a prismatic battery.

The positive electrode collector has a thickness ranging from about 3 μm to about 500 μm. The positive electrode collector may be any collector, provided that the collector does not cause a chemical change in the battery and has high conductivity. For example, the positive electrode collector may be formed of stainless steel, aluminum, nickel, titanium, baking carbon, or aluminum or stainless steel with a surface treated with carbon, nickel, titanium, or silver. The positive electrode collector may have an uneven surface to improve bonding strength with an active material, and may include a film, a sheet, foil, a net, a porous body, a foam body, or a non-woven body.

A mixture containing the positive electrode active material includes about 1% to about 50% by weight of the conductive material. The conductive material may be any material, provided that the conductive material does not cause a chemical change in the battery and has conductivity. For example, the conductive material may include graphite such as natural graphite and artificial graphite; carbon black such as acetylene black, Ketjen black, channel black, furnace black, lamp black, and summer black; conductive fiber such as carbon fiber and metal fiber; metal powder such as carbon fluorine, aluminum, and nickel powder; conductive whisker such as zinc oxide and potassium titanate; a conductive oxide such as titanium oxide; or a polyphenylene derivative.

The binder binds the active material, the conductive material, and the collector. The mixture containing the positive electrode active material includes about 1% to about 50% by weight of the binder. For example, the binder may include one of poly vinylidene fluoride, poly vinyl alcohol, carboxymethyl cellulose (CMC), dextrin, hydroxypropyl cellulose, regenerated cellulose, poly vinyl pyrrolidone, tetrafluoroethylene, polyethylene, polypropylene, ethylene propylene diene terpolymer (EPDM), sulfonated EPDM, stylene butylene rubber, fluoro rubber, and various copolymers.

A filler may be any material for suppressing swelling of the positive electrode, provided that the filler does not cause a chemical change in the battery and has a fibrous structure. For example, the filler may include an olefin-based copolymer such as polyethylene and polypropylene; or a fibrous material such as glass fiber and carbon fiber.

The negative electrode is formed by applying a negative electrode material on the negative electrode collector and drying it, and may include the above-described components, if necessary.

The negative electrode collector has a thickness ranging from about 3 μm to about 500 μm. The negative electrode collector may include any material, provided that the collector does not cause a chemical change in the battery and has conductivity. For example, the negative electrode collector may include copper, stainless steel, aluminum, nickel, titanium, baking carbon, copper or stainless steel with a surface treated with carbon, nickel, titanium, or silver, or an aluminum-cadmium alloy. Like the positive electrode collector, the negative electrode collector may have an uneven surface to improve bonding strength with an active material, and may include a film, a sheet, foil, a net, a porous body, a foam body, or a non-woven body.

The negative electrode material includes amorphous carbon or crystalline carbon. In detail, the negative electrode material may include: carbon such as hard carbon and graphite based carbon; a complex metal oxide such as $LixFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, or Ge; Me': Al, B, P, Si, Groups I, II and III elements, or halogen; $0 < x \leq 1$; $1 \leq y \leq 3$; $1 \leq z \leq 8$); a lithium metal; a lithium alloy; a silicon-based alloy; a stannum-based alloy; an oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material.

An electrolyte layer according to an embodiment of the present invention includes non-aqueous electrolyte and a lithium salt. The non-aqueous electrolyte may be solid electrolyte or inorganic solid electrolyte.

For example, the non-aqueous electrolyte may include an aprotic organic solvent such as N-methyl-2-pyrrolidone, propylene carbonate, ethylene carbonate, butylene carbonate, dimethyl carbonate, diethyle carbonate, gamma-butyrolacton, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, a dioxolane derivative, sulfolan, methyl sulfolan, 1,3-dimethyl-2-imidazolidinone, a propylene carbonate derivative, a tetrahydrofuran derivative, ether, methyl propionate, and ethyl propionate.

For example, the organic solid electrolyte may include a copolymer including a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic disintegrator.

For example, the inorganic solid electrolyte may include a Li-based nitride such as $Li_3N$, $LiI$, $Li_5NI_2$, $Li_3N—LiI—LiOH$, $LiSiO_4$, $LiSiO_4—LiI—LiOH$, $Li_2SiS_3$, $Li_4SiO_4$, $Li_4SiO_4—LiI—LiOH$, and $Li_3PO_4—Li_2S—SiS_2$, a halide, or a sulfate.

The lithium salt is easily dissolved in the non-aqueous electrolyte. For example, the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, 4-phenyl lithium borate, or an imide.

Further, the following compounds can be added to the non-aqueous electrolyte in order to improve discharge and charge characteristics and flame retardancy. Examples include pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride. In order to provide incombustibility to the electrolyte, the electrolyte may further include a halogen-containing solvent such as carbon tetrachloride and ethylene trifluoride. Further, in order to improve high-temperature storage characteristics, the electrolyte may include carbon dioxide gas.

Examples of the applications of the lithium secondary battery according to the present invention include all devices in which an electrochemical reaction occurs, such as primary and secondary batteries, fuel cells, solar cells, and capacitors. Examples of a lithium secondary battery as a secondary battery include a lithium metal secondary battery, a lithium ion secondary battery, a lithium polymer secondary battery, and a lithium ion polymer secondary battery.

Batteries configured as described above, as unit cells, may be connected to each other in a well-known method to function as a medium-to-large battery that may be applied to a power tool requiring high power, EV, HEV, and PHEV.

A lithium secondary battery according to the present invention will now be described in more detail according to the following embodiments, but the present invention is not limited thereto.

First Embodiment

An electrode assembly was formed by winding a positive electrode, a negative electrode, and a separator disposed therebetween in a jelly roll shape. The positive electrode included a positive electrode collector having a non-coating portion that was not coated with an active material. The negative electrode included a negative electrode collector having a non-coating portion that was not coated with an active material. The non-coating portions were disposed in the upper and lower portions of the electrodes in the longitudinal direction of the electrodes as illustrated in FIG. 7. Positive and negative electrode tabs were connected to the non-coating portions. The separator was a complex porous separator including a polypropylene substrate coated with polyvinylidenefluoride-co-hexafluoropropylene as a binder polymer. The electrode assembly was designed such that the positive electrode, the separator, and the negative electrode constitute a laminated structure as illustrated in FIG. 9, and a battery including the electrode assembly was fabricated.

Second Embodiment

Non-coating portions of positive and negative electrodes were disposed in the upper portion of an electrode assembly in the longitudinal direction of the electrodes as illustrated in FIG. 5. Positive and negative electrode tabs were connected to the non-coating portions.

A second embodiment was the same as the first embodiment except that the separator was a complex porous separator including a polypropylene substrate coated with polyvinylidenefluoride-co-hexafluoropropylene as a binder polymer and a mixture of $BaTiO_3$ and $Al_2O_3$ as inorganic particles.

Third Embodiment

A third embodiment was the same as the first embodiment except for the followings. Non-coating portions of positive and negative electrodes were disposed in the lower portion of an electrode assembly in the longitudinal direction of the electrodes as illustrated in FIG. 6. Positive and negative electrode tabs were connected to the non-coating portions.

First Comparative Example

Instead of disposing non-coating portions in the upper and lower portions of an electrode assembly in the longitudinal direction of the electrodes as in the first embodiment, the non-coating portions were disposed in the left and right portions of the electrode assembly as in the related art. Positive and negative electrode tabs were connected to the non-coating portions. A separator was a typical olefin-based separator, and the electrode assembly was formed by winding the electrodes and the separator in a typical roll structure instead of a laminated structure, as illustrated in FIG. 3.

Second Comparative Example

A second comparative example was the same as the first embodiment except for the followings. A separator was a typical olefin-based separator, and an electrode assembly was formed by winding positive and negative electrodes and the separator in a typical roll structure instead of a laminated structure, as illustrated in FIG. 3.

Discharge capacities of batteries fabricated according to the first through third embodiments and the first and second comparative examples were measured according to C-rates, which are shown in Table 1.

TABLE 1

| | Rate of Discharge Capacity (%) according to C-rate | | | | |
|---|---|---|---|---|---|
| | 0.2 C | 1 C | 2 C | 3 C | 4 C |
| EMBODIMENT 1 | 100 | 97 | 59 | 32 | 19 |
| EMBODIMENT 2 | 100 | 98 | 60 | 31 | 20 |
| EMBODIMENT 3 | 100 | 99 | 58 | 32 | 21 |
| COMPARATIVE EX 1 | 100 | 94 | 43 | 20 | 3.4 |
| COMPARATIVE EX 2 | 100 | 93 | 44 | 19 | 3.0 |

As shown in Table 1, the discharge capacities of the batteries including the electrode assembly according to the embodiments are greater than those of the batteries including the electrode assembly according to the comparative examples.

First Experimental Example

Figure 13:
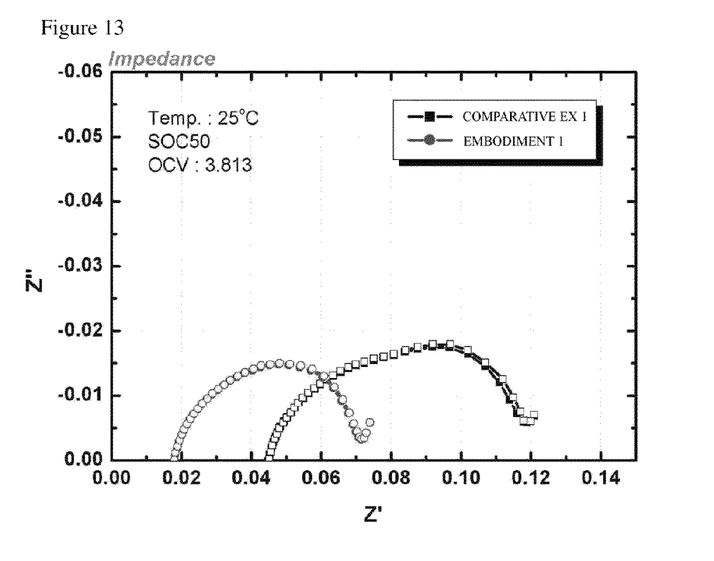
FIG. 13 is a graph illustrating impedances of batteries including jelly-roll shaped electrode assemblies according to a first embodiment and a first comparative example.

Impedances of the batteries including the jelly-roll shaped electrode assemblies of the first embodiment and the first comparative example were measured to detect variations in resistance thereof, as illustrated in FIG. 13.

As shown in FIG. 13, the resistance of the battery of the first embodiment is less than that of the battery of the first comparative example. This is because the non-coating portions according to the embodiment were disposed in at least one of the upper and lower portions of the electrode assembly in the longitudinal direction of the electrodes, thereby effectively reducing the resistance of the battery.

Second Experimental Example

The electrode assemblies of the first embodiment and the second comparative example were wound, and then, a room temperature press process and a hot press process were performed on the electrode assemblies. Results of the press processes are shown in FIG. 14.

Figure 14:
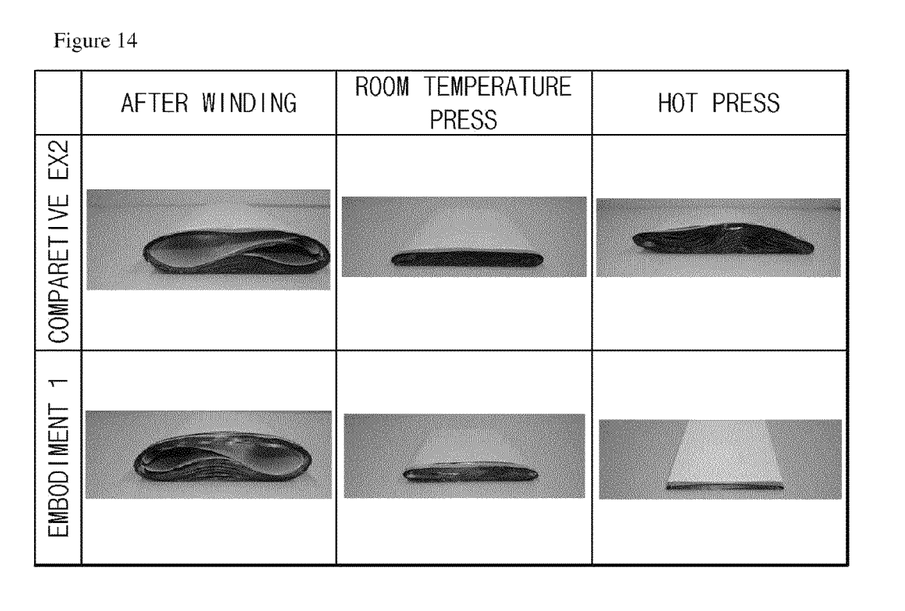
FIG. 14 is a table showing jelly-roll shaped electrode assemblies before and after a hot press process and a room temperature press process according to the first embodiment and a second comparative example.

As shown in FIG. 14, the electrode assemblies had similar oval shapes after the winding.

In addition, the electrode assemblies were more flat through the room temperature press process that is typically used to fabricate a prismatic type battery, but there were gaps between the electrodes and the separator.

Through the hot press process, the electrode assembly of the second comparative example had a wave shape by contraction of the olefin-based separator due to heat. Meanwhile, the electrode assembly according to the first embodiment was compressed well without a wave shape. This is because the battery according to the first embodiment includes the organic/inorganic complex separator, and has the laminated structure in which the positive electrode, the negative electrode, and the separator are integrally formed. Accordingly, a battery fabrication process is facilitated, and the performance and safety of a battery are improved.

Third Experimental Example

A plurality of batteries fabricated according to each of the first through third embodiments and the first and second comparative examples were connected to each other to form a medium-to-large battery. Then, discharge powers (SOC 50 and 10 sec) of the medium-to-large batteries were measured and compared as shown in Table 3.

TABLE 3

| | COMPARATIVE EX 1 | COMPARATIVE EX 2 | EMBODIMENT 1 | EMBODIMENT 2 | EMBODIMENT 3 |
|---|---|---|---|---|---|
| DISCHARGE POWER (%) | 100 | 100 | 122 | 132 | 130 |

As shown in Table 3, the discharge powers of the medium-to-large batteries according to the first through third embodiments are greater than those of the medium-to-large batteries according to the first and second comparative examples.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

The invention claimed is:

1. An electrode assembly comprising:
a positive electrode;
a negative electrode; and
a separator,
wherein the positive electrode includes a positive electrode non-coating portion that is not coated with an active material in a portion of a positive electrode collector,
the negative electrode includes a negative electrode non-coating portion that is not coated with an active material in a portion of a negative electrode collector,
both the positive electrode non-coating portion and the negative electrode non-coating portion are disposed at the upper portion of electrode assembly in a longitudinal direction of the electrodes, or both the positive electrode non-coating portion and the negative electrode non-coating portion are disposed at the lower portion of electrode assembly in a longitudinal direction of the electrodes,
a positive electrode tab and a negative electrode tab are connected to the outermost non-coating portions of the positive electrode and the negative electrode,
the separator is a complex porous separator including a substrate coated with a binder polymer or an organic/inorganic mixture formed of a binder polymer and inorganic particles, and the electrode assembly comprises a laminated structure formed by performing a hot press process or a thermo-compression press process.

2. The electrode assembly of claim 1, wherein the non-coating portions of the positive electrode and negative electrode are spaced apart from at least one of upper and lower ends or from both upper and lower ends of the electrode assembly by a distance to weld the electrode tabs to the non-coating portions.

3. The electrode assembly of claim 2, wherein the non-coating portions of the positive electrode and negative electrode are spaced apart from at least one of upper and lower ends or from both upper and lower ends of the electrode assembly by a distance ranging from about 1 mm to about 20 mm.

4. The electrode assembly of claim 1, wherein the positive electrode tab and the negative electrode tab are disposed at the same side.

5. The electrode assembly of claim 1, wherein the separator covers active material coating portions of the positive and negative electrodes.

6. The electrode assembly of claim 1, wherein the electrode assembly is wound in a jelly-roll shape.

7. The electrode assembly of claim 1, wherein the active materials of the positive electrode and negative electrode are disposed out of the non-coating portions of the positive electrode and negative electrode, and are applied on at least one surface of the electrode assembly.

8. The electrode assembly of claim 1, wherein the binder polymer constituting the separator comprises at least one of polyvinylidenefluoride-co-hexafluoropropylene, polyvinylidene fluoride-cotrichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

9. The electrode assembly of claim 1, wherein the inorganic particle comprises at least one selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof.

10. The electrode assembly of claim 9, wherein the inorganic particle comprises a porous structure including a plurality of macropores having a diameter of about 50 nm or greater therein.

11. The electrode assembly of claim 1, wherein the substrate comprises at least one selected from the group consisting of high density polyethylene, low density polyethylene, linear low density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, and a mixture thereof.

12. A secondary battery comprising an electrode assembly, wherein the electrode assembly includes:
a positive electrode;
a negative electrode; and
a separator,
wherein the positive electrode includes a positive electrode non-coating portion that is not coated with an active material in a portion of a positive electrode collector,
the negative electrode includes a negative electrode non-coating portion that is not coated with an active material in a portion of a negative electrode collector,
both the positive electrode non-coating portion and the negative electrode non-coating portion are disposed at the upper portion of electrode assembly in a longitudinal direction of the electrodes, or both the positive electrode non-coating portion and the negative electrode non-coating portion are disposed at the lower portion of electrode assembly in a longitudinal direction of the electrodes,
a positive electrode tab and a negative electrode tab are connected to the outermost non-coating portions of the positive electrode and the negative electrode, and
the separator is a complex porous separator including a substrate coated with a binder polymer or an organic/inorganic mixture formed of a binder polymer and inorganic particles, and the electrode assembly comprises a laminated structure formed by performing a hot press process or a thermo-compression press process.

13. The secondary battery of claim 12, wherein the secondary battery is one of a prismatic type battery and a polymer battery.

14. A medium-to-large battery comprising the secondary battery of claim 12, wherein the secondary battery is provided in plurality, and the secondary batteries are connected to each other.

* * * * *